(12) United States Patent
Ota et al.

(10) Patent No.: US 6,544,462 B1
(45) Date of Patent: Apr. 8, 2003

(54) DRAWING METHOD

(75) Inventors: Shinji Ota, Gifu (JP); Hirofumi Yashiro, Gifu (JP); Yuki Meguro, Gifu (JP)

(73) Assignee: Ube Nitto Kasei Co., Ltd., Tokyo (JP)

( * ) Notice: Subject to any disclaimer, the term of this patent is extended or adjusted under 35 U.S.C. 154(b) by 246 days.

(21) Appl. No.: 09/699,492

(22) Filed: Oct. 31, 2000

Related U.S. Application Data

(62) Division of application No. 09/424,717, filed as application No. PCT/JP99/00178 on Jan. 20, 1999, now Pat. No. 6,203,902.

(30) Foreign Application Priority Data

Mar. 31, 1998 (JP) .......................................... H10-85584
Jun. 3, 1998 (JP) .......................................... H10-154242

(51) Int. Cl.$^7$ ................................................. D02J 1/22
(52) U.S. Cl. .................................. 264/289.3; 264/289.6
(58) Field of Search ............................. 264/289.3, 289.6

(56) References Cited

U.S. PATENT DOCUMENTS 2,934,400 A * 4/1960 Siggel et al. ........ 264/289.3 X
4,418,032 A * 11/1983 Keil ........................ 264/289.6
4,560,734 A * 12/1985 Fujishita et al. ..... 264/289.6 X

FOREIGN PATENT DOCUMENTS

| JP | 35-24823 Y | 9/1960 |
| JP | 40-1468 B | 1/1965 |
| JP | 47-14420 A | 8/1972 |
| JP | 62-14118 A | 6/1987 |
| JP | 6-101115 A | 4/1994 |
| JP | 7-243121 A | 9/1995 |
| JP | 7-268741 A | 10/1995 |

* cited by examiner

Primary Examiner—Leo B. Tentoni
(74) Attorney, Agent, or Firm—Nixon & Vanderhye

(57) ABSTRACT

Crystalline polymers are drawn using pressurized saturated steam having an absolute pressure of at least 2.0 kg/cm$^2$ as a drawing medium. The steam is charged into an airtight container having a drawable material inlet for feeding a drawable material and a drawn product outlet for withdrawing a drawn product. Pressurized water is utilized to prevent leakage of the pressurized saturated steam through the inlet and outlet and to cool the drawn product, so that the product formed of a crystalline polymer has improved physical properties.

12 Claims, 2 Drawing Sheets

30 μm

DRAWING METHOD

This is a division of application Ser. No. 09/424,717, filed on Dec. 6, 1999, now U.S. Pat. No. 6,203,902, which is a 371 of PCT/JP99/00178, filed Jan. 20, 1999.

TECHNICAL FIELD

The present invention relates to a drawing method, a drawn product and a processed article of the above drawn product. It particularly relates to a drawing method suitable for obtaining a crystalline polymer drawn product, a drawn product produced by the above method and a processed article of a polypropylene fiber using, as a material fiber, a polypropylene fiber included in the above drawn product.

TECHNICAL BACKGROUND

The physical properties of a crystalline polymer product such as a synthetic fiber, a resin film, a resin sheet, or the like are intensely influenced by the internal structure thereof (fine structure of a crystalline polymer), and the internal structure is relatively easily altered by drawing or heat treatment. And, in many cases, a drawn product has physical properties more desirable in practical use than a non-drawn product, and at a higher draw ratio, a drawn product excellent in physical properties such as strength and Young's modulus. Generally, drawing treatment is therefore carried out for obtaining crystalline polymer products, particularly a synthetic fiber, a resin film and a resin sheet. Further, a drawn product is heat-treated as required.

As a drawing method for obtaining crystalline polymer products, various methods are known. For example, when a synthetic fiber is produced, there is applied a method of drawing such as contact heat drawing with a metal hot roll or a metal hot plate or non-contact heat drawing with hot water, steam having a pressure of approximately atmospheric pressure to 2 kg/cm$^2$ or far infrared.

Meanwhile, a change in the fine structure of a crystalline polymer is influenced by drawing conditions to a great extent, and as a result, the physical properties of a crystalline polymer product are also influenced by the drawing conditions to a great extent, while failures such as draw breaking is caused when drawing is forcibly carried out.

For example, in a polypropylene (to be abbreviated as "PP" hereinafter) fiber, the fiber strength thereof is improved when a non-drawn yarn is drawn at a temperature which is lower than the melting point of the resin (PP) but is as high as possible, at a low deformation rate at a higher draw ratio. When attempts are made to draw the fiber at a high deformation rate at a high draw ratio, draw breaking easily takes place. The fiber strength of industrially (commercially) producible PP fibers, i.e., the fiber strength of PP fibers that can be produced at a rate of approximately 50 m/minute or higher is approximately 10 g/d (e.g., see Japanese Patent 2,537,313).

However, when drawing is carried out at a very low deformation rate without considering productivity, there can be obtained a PP fiber having a higher fiber strength. For example, a Japanese periodical, "Kobunshi Ronbunshu" (Vol. 54, No. 5, May, 1997), pages 351 to 358 describes a PP fiber having a fiber strength of approximately 13.4 g/d, produced by a continuous zone drawing method. When the above PP fiber is obtained, however, the feed rate of a fiber in a continuous zone drawing step is as small as 0.5 m/minute.

As described above, a change in the fine structure of a crystalline polymer is greatly influenced by drawing conditions, and as a result, the physical properties of drawn product formed of the crystalline polymer are greatly influenced by the drawing conditions. When forcible drawing is attempted, there are caused failures such as draw breaking. The physical property values of a drawn product formed of a crystalline polymer, which can be obtained by a conventional drawing method, have upper limits depending upon the material quality of the drawn product formed of the crystalline polymer.

However, products formed of crystalline polymers are used in various fields, and with an increase in demands thereof, products formed of the crystalline polymers are constantly required to be improved in physical properties.

DISCLOSURE OF THE INVENTION

The present invention has been made for providing a drawing method in which a drawn product having more desirable physical properties is easily industrially obtained, a drawn product which can be easily industrially obtained as a product having more desirable physical properties, and a polypropylene fiber processed article formed of a polypropylene fiber included in the above drawn product as a fiber material.

The drawing method of the present invention for achieving the above object comprises:

charging pressurized saturated steam having an absolute pressure of at least 2.0 kg/cm$^2$ as a drawing medium into an airtight container having a drawable material inlet for feeding a drawable material thereinto and a drawn product outlet for withdrawing a drawn product formed by drawing the drawable material, to provide a drawing chamber;

utilizing pressurized water to prevent the leakage of the pressurized saturated steam through said drawable material inlet and said drawn product outlet, respectively;

introducing a drawable material into the pressurized water which is preventing the leakage of the pressurized saturated steam from said drawable material inlet;

introducing said drawable material through said drawable material inlet to the drawing chamber to draw the drawable material after water adheres to the drawable material surface; and then, introducing a drawn product withdrawn through said drawn product outlet into the pressurized water which is preventing the leakage of the pressurized saturated steam through said drawn product outlet, to cool the drawn product.

Further, the drawn product of the present invention for achieving the above object is a product obtained by drawing a drawable material by the above method of the present invention.

The polypropylene fiber processed article of the present invention for achieving the above object is formed of a polypropylene fiber included in the drawn product of the present invention as a material fiber, and it characteristically has the fiber form of any one of a filament, a short cut chop and a staple fiber.

BEST MODES FOR CARRYING OUT THE INVENTION

Figure 1:
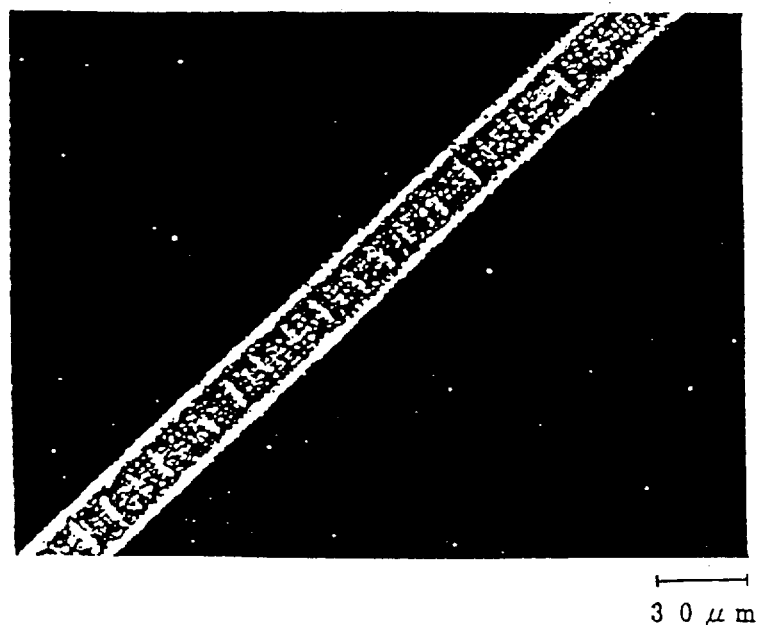
FIG. 1 is a copy of an enlarged microscopic photograph (×400 diameters) taken when a PP fiber obtained in Example 1 was observed under polarization through crossed Nicol prisms.

The modes of practice of the present invention will be explained hereinafter.

First, the drawing method of the present invention will be explained.

The present inventors have made diligent studies for a method of deforming a crystalline polymer to a high degree at a higher rate. As a result, it has been found that by allowing water to adhere to the surface of a drawable material formed of a crystalline polymer and drawing the drawable material by means of a drawing chamber using a high-pressure pressurized saturated steam as a drawing medium, a drawable material can be deformed to a greater extent than in a conventional drawing method, and when deformation amounts of drawn products are the same, there can be obtained a drawn product having more desirable properties in practical use than in a conventional drawing method. The present invention has been accordingly completed.

In the drawing method of the present invention based on the above finding, there is used a specific drawing chamber as described above, i.e., a drawing chamber using a pressurized saturated steam having an absolute pressure of at least 2.0 kg/cm$^2$ as a drawing medium.

The container for constituting the above drawing chamber is required to have such a high airtightness that no pressurized saturated steam leaks. On the other hand, the above container is required to be provided with a drawable material inlet for introducing a drawable material into the above container (into the drawing chamber) and a drawn product outlet for withdrawing a drawn product out of the container (out of the drawing chamber). Naturally, therefore, pressured saturated steam leaks through the above drawable material inlet and the above drawn product outlet.

However, the absolute pressure of the pressured saturated steam in the drawing chamber is required to be maintained at a predetermined value. It is therefore preferred to provide the drawing chamber with leakage prevention means for preventing the leakage of pressured saturated steam through the above drawable material inlet and the above drawn product outlet.

As conventional means for preventing the leakage of pressurized steam, a labyrinth sealing method is known. In this method, fins are used to form a multi-staged narrow flow path and the pressure of a drawing medium (pressurized steam) in a drawing chamber is maintained by utilizing a pressure loss caused when the drawing medium flows through the above path. However, this method has a problem that a drawable material contacts the fins to be liable to have a trouble since there are many chances that the drawable material contact the fins which are structurally indispensable. Further, theoretically, the drawable material is temperature-increased to begin softening itself in the labyrinth, that is, the drawable material is temperature-increased to begin softening itself before it enters a drawing chamber, so that the frequency of occurrence of the trouble when the drawable material and the fins contact each other is liable to increase. Similarly, since a drawn product is not cooled immediately after drawn, the contact between the drawn product and the fins are liable to cause troubles frequently. For sufficiently maintaining the pressure of the drawing medium in the drawing chamber, it is required to increase the number of "narrow flow path" (the number of the fins), so that there is another problem that an apparatus increases in size in addition to the above fact that the number of contact chances further increases.

In the drawing chamber used in the method of the present invention, therefore, the leakage of pressurized saturated steam through a drawable material inlet is prevented with new leakage preventing means utilizing pressurized water. When the leakage preventing means utilizing pressurized water is used, a drawable material can be introduced into the above pressurized water, whereby there can be easily achieved (a) prevention of a drawable material from beginning to soften due to a temperature increase before the drawable material enters the drawing chamber, (b) decreasing the contact between the drawable material and the leakage preventing means, and (c) allowing water to adhere to the drawable material surface. In this case, preferably, the time period for which the drawable material passes through the water is determined to be at least 0.1 second.

In the drawing chamber used in the method of the present invention, the leakage of the pressurized saturated steam through the drawn product outlet is also prevented with another leakage preventing means utilizing pressurized water. When the above leakage preventing means is used, a drawn product can be readily cooled by introducing the drawn product into the above leakage preventing means (into the pressurized water) immediately after drawing is carried out, so that the trouble caused by a contact between the drawn product and the leakage preventing means can be easily decreased. In this case, preferably, the time period for which the drawn product passes through the water is determined to be at least 0.2 second.

Further, when the above leakage preventing means utilizing pressurized water (two means on the drawable material inlet side and on the drawn product outlet side) are used, the leakage preventing means even for a pressurized saturated steam having a high absolute pressure can be easily decreased in size.

The drawable material that is to be drawn by the method of the present invention using the above drawing chamber can be any drawable material so long as it is formed of a crystalline polymer which is desired to be drawn for obtaining an end product. Specific examples of the form thereof include a non-drawn yarn for a synthetic fiber, a non-drawn film, a non-drawn sheet, a non-drawn material for a packaging band and a non-drawn material for a packaging tape.

The material of the drawable material is not specially limited so long as it is a crystalline polymer. Specific examples thereof include homopolymers such as PP, polyethylene, poly-4-methylpentene-1 and polyoxymethylene and copolymers such as a copolymer of PP and an α-olefin (such as ethylene or butene-1) and a copolymer of polyethylene and butene-1.

When the drawable material is drawn in the pressurized saturated steam, it may be drawn one by one, or when the drawable material is, for example, non-drawn yarns for a synthetic fiber, a bundle of a predetermined number of the collected non-drawn yarns may be drawn. Further, the draw ratio can be properly determined depending upon material quality of the drawable material, the temperature and absolute pressure of the pressurized saturated steam used, physical properties which a drawn product as an end product is required to have, and use of a drawn product as an end product.

However, the absolute pressure of the pressurized saturated steam is preferably determined to be at least 2.0 kg/cm$^2$ (the pressurized saturated steam in this case has a temperature of 120° C.). A pressurized saturated steam having an absolute pressure of less than 2.0 kg/cm$^2$ generally has a temperature of as low as less than 120° C. When such a pressurized saturated steam is used as a drawing medium, therefore, it is difficult to carry out drawing at a high draw ratio, and it is difficult to industrially produce a drawn product having more preferred physical properties in practical use. If it is acceptable to decrease productivity, a pressurized saturated steam having an absolute pressure of 2.0 kg/cm$^2$ can be used.

The temperature and the absolute pressure of the pressurized saturated steam are preferably adjusted to a highest possible temperature and a highest possible pressure in ranges where the drawable material is not softened. However, with an increase in the temperature of the pressurized saturated steam, the absolute pressure thereof also increases, and it is therefore difficult to design a drawing chamber using the pressurized saturated steam as a drawing medium. It is therefore preferred to determine the temperature and the absolute pressure of the pressurized saturated steam by taking account of the material quality of the drawable material, the productivity of the drawn product and the production cost of a drawing apparatus.

For example, when the drawable material is formed of a PP homopolymer, it is preferred to adjust the absolute pressure of the pressurized saturated steam to a pressure between 3.0 kg/cm$^2$ (temperature of 133° C.) and 5.0 kg/cm$^2$ (temperature of 151° C.) rather than adjusting it to a pressure between at least 2.0 kg/cm$^2$ (temperature of 120° C.) and less than 3.0 kg/cm$^2$ (temperature of 133° C.). It is more preferred to adjust it to a pressure between 3.5 kg/cm$^2$ (temperature of 139° C.) and 4.5 kg/cm$^2$ (temperature of 148° C.).

When the above temperature and absolute pressure of the pressurized saturated steam are too high, the drawable material is softened, and it does not undergo orientation of molecular chains even if drawn and causes downgrading of physical properties due to its relaxation. It is therefore difficult to produce a drawn product having more desirable physical properties. When the production speed is more increased, however, there can be used a pressurized saturated steam having a higher temperature and a higher pressure as a drawing medium. For example, when the drawn product as an end product is a PP fiber, the production speed can be more increased by applying a spin draw method, etc., and a pressurized saturated steam having a high temperature of 180° C. and a high pressure (absolute pressure of 10.2 kg/cm$^2$) can be accordingly used as a drawing medium.

In the method of the present invention, the drawable material is cooled with water (pressurized water) until it reaches the inlet to the drawing chamber, and then the drawable material in a state where water adheres to its surface is drawn in the pressurized saturated steam, so that the above water (this water will be referred to as "brought-in water" hereinafter) is naturally present on the drawable material during its drawing. Further, due to heat exchange on the drawable material surface in the steam, water is formed by condensation on the drawable material surface. And, in a state where the water (the above brought-in water and the above water formed by condensation) is present on the drawable material surface, the drawable material is drawn in the pressurized saturated steam having a high temperature and a high pressure. Even if an internal heat generation takes place due to draft deformation, the surface temperature of the drawable material is inhibited from going up to a level higher than the temperature of the pressurized saturated steam, and the surface of the drawable material is not easily brought into a molten state.

A temperature increase on the drawable material surface is prevented, and the temperature on the above surface is inhibited from going up to a level higher than the temperature of the pressurized saturated steam. On the other hand, heat generation by deformation takes place inside the drawable material. As a result, in the present invention, it is assumed that a certain structural change different from that in a conventional method proceeds inside the drawable material, and the drawable material can be deformed to a greater extent than in a conventional drawing method, so that there can be obtained a drawn product having more desirable physical properties even if the deformation amount of the drawable material is the same as a conventional one. The assumption of proceeding of the structural change different from that in a conventional method during the drawing is supported by a phenomenon which occurs at a later stage of drawing when a PP fiber is obtained according to the method of the present invention, that is, a phenomenon that a weight denier decreases while a change in the outer diameter of a fiber comes to be very small.

Further, in the method of the present invention, drawing is carried out in a pressurized saturated steam having a high temperature and a high pressure, so that the temperature inside the drawable material can be elevated to a predetermined temperature for a short period of time. Moreover, the resultant drawn product is introduced into pressurized water and readily cooled. Owing to these factors as well, the drawn product as an end product can be easily obtained at an industrially productive speed.

In contrast thereto, in conventional contact heat drawing with a metal hot roll or a metal hot plate, or in conventional non-contact heat drawing with hot water, steam having a pressure of approximately atmospheric pressure to 2 kg/cm$^2$ or far infrared, (1) a drawable material is drawn in a state where water is not present on the drawable material surface (contact heat drawing or non-contact heat drawing with far infrared), (2) water is present around a drawable material during its drawing while a drawing medium has neither a high temperature nor a high pressure (non-contact heat drawing with hot water), (3) water inevitably adheres to a drawable material surface due to water formation by condensation before the drawable material enters a drawing chamber while the water amount is too small to obtain the above-described function and effect of the present invention (non-contact heat drawing with steam having a pressure of approximately atmospheric pressure to 2 kg/cm$^2$), or (4) a drawable material is temperature-increased to be softened before drawn and the drawable material comes into contact with part of an apparatus in a state where maintenance of its form is destabilized, or a drawn product is not fully cooled and the drawn product comes into contact with part of an apparatus in a state where maintenance of its form is destabilized (all of conventional drawing methods). It is therefore assumed that the drawable material cannot be deformed to a greater extent than in the method of the present invention, and that when the deformation amount is the same as that in the method of the present invention, obtained drawn products are not so improved in physical properties as drawn product obtained according to the method of the present invention.

For practicing the method of the present invention having the above advantages, there is required a drawing apparatus having wetting means for allowing water to adhere to a drawable material surface, a drawing chamber using the specified pressurized saturated steam as a drawing medium and leakage preventing means for preventing the pressurized saturated steam from leaking the above drawing chamber. The structure of the above drawing apparatus is not specially limited, while it is preferred to use an apparatus using pressurized water as leakage preventing means since the leakage preventing means can be allowed to co-work as the above wetting means.

As a specific example of the above drawing apparatus that is for mono-axial drawing, there is an apparatus having, e.g., the following structure.

That is, there is a drawing apparatus having a drawing chamber portion formed of an airtight container charged with pressurized saturated steam as a drawing medium, said airtight container having a drawable material inlet for feeding a drawable material thereinto and a drawn product outlet for withdrawing a drawn product formed by drawing the above drawable material fed inside;

a first pressurized water chamber portion tightly disposed on the above drawable material inlet side of the above drawing chamber portion;

a second pressurized water chamber portion tightly disposed on the drawn product outlet side of the drawing chamber portion;

holes formed in the above first and second pressurized water chamber portions one each so as to lead the drawable material or the drawn product from an outside of the above first pressurized water chamber portion to an outside of the above second pressurized water chamber through an inside of the above first pressurized water chamber portion, the above drawable material inlet, an inside of the above drawing chamber portion, the above drawn product outlet and an inside of the above second pressurized water chamber portion;

drawable material feeding means for feeding the drawable material into the above first pressurized water chamber; and drawn product withdrawing means for withdrawing the drawn product from the above second pressurized water chamber portion at a rate higher than the rate at which the drawable material feeding means feeds the drawable material.

Like a conventional drawing chamber using pressurized saturated steam as a drawing medium, the above drawing chamber portion may be any chamber portion so long as it has an airtightness and strength adequate for the use of pressurized saturated steam having a predetermined absolute pressure (at least 2.0 kg/cm$^2$) as a drawing medium and can secure a predetermined size (length).

The above first pressurized water chamber portion is for preventing the leakage of the pressurized saturated steam out of the drawing chamber portion through the drawable material inlet formed in the drawing chamber portion, and at the same it is for allowing water to adhere to the surface of the above drawable material introduced into pressurized water. In the first pressurized water chamber is reserved pressurized water having an absolute pressure equivalent to, or slightly higher than, the absolute pressure of the pressurized saturated steam in the drawing chamber portion. The above second pressurized water chamber portion is for preventing the leakage of the pressurized saturated steam out of the drawing chamber portion through the above drawn product outlet, and at the same it is for cooling the drawn product withdrawn through the drawn product outlet and introduced into pressurized water. In the second pressurized water chamber is also reserved pressurized water having an absolute pressure equivalent to, or slightly higher than, the absolute pressure of the pressurized saturated steam in the drawing chamber portion. These first and second pressurized water chamber portions are disposed outside the drawing chamber portion respectively.

The drawing chamber portion, the first pressurized water chamber portion and the second pressurized water chamber portion may be separately formed and closely arranged so as to be related to one another as predetermined, or they may be formed by sectioning a single container or cylinder at predetermined intervals. Further, the drawing chamber portion and the first pressurized water chamber portion may have a partition in common between them. Similarly, the drawing chamber portion and the second pressurized water chamber portion may have a partition in common between them.

The drawable material comes from an outside of the first pressurized water chamber portion, passes an inside of the first pressurized water chamber portion and enters the drawing chamber portion through the above drawable material inlet. A predetermined place of a container wall of the first pressurized water chamber portion has a hole for drawing the drawable material into the first pressurized water chamber portion (to be referred to as "hole A" hereinafter), and a predetermined place of a container wall of the first pressurized water chamber portion has a hole for drawing the drawable material out of the first pressurized water chamber portion (to be referred to as "hole B" hereinafter).

The drawn product produced by drawing the drawable material fed into the drawing chamber portion is required to be withdrawn from the drawn product outlet to an outside of the second pressurized water chamber portion through an inside of the second pressurized water chamber portion. Similarly, therefore, a predetermined place of a container wall of the second pressurized water chamber portion has a hole for drawing the drawn product from the drawing chamber into the second pressurized water chamber portion (to be referred to as "hole C" hereinafter), and a predetermined place of a container wall of the second pressurized water chamber portion has a hole for drawing the drawn product out of the second pressurized water chamber portion (to be referred to as "hole D" hereinafter).

The above drawable material inlet, drawn product outlet and holes A, B, C and D, the above holes C and D in particular, are preferably formed and arranged such that the drawable material or the drawn product does not come in contact with the container wall when the drawable material or the drawn product passes. Further, they are preferably designed such that pressurized saturated steam is the least possible ejected through these inlet, outlet and holes.

The drawable material feeding means constituting the above drawing apparatus is for feeding a drawable material into the first pressurized water chamber portion at a constant rate, and the drawable material feeding means is provided outside the pressurized water chamber portion. Further, the drawn product withdrawing means is for withdrawing a drawn product, which has passed through the second pressurized water chamber portion, from the second pressurized water chamber portion at a rate higher than the rate at which the drawable material is fed with the drawable material feeding means, whereby the drawable material is drawn mainly in the drawing chamber portion. The above drawn product withdrawing means is provided outside the second pressurized water chamber portion.

The drawable material feeding rate of the drawable material feeding means and the drawn product withdrawing rate of the drawn product withdrawing means are properly determined so as to obtain a drawn product at a predetermined draw ratio at a predetermined production rate. As the drawable material feeding means and the drawn product withdrawing means, there can be used various rollers used for conventional drawing.

When a drawn product is produced according to the method of the present invention, monoaxially drawn products can be industrially easily obtained with the above drawing apparatus. For preventing the leakage of pressurized water in the first pressurized water chamber portion through the above hole A formed in the first pressurized water chamber portion constituting the drawing apparatus, it is preferred to provide a buffer water chamber portion, which is to submerge the hole A to reduce the leakage of water through the above hole A, outside the first pressurized water chamber portion. Similarly, for preventing the leakage of pressurized water in the second pressurized water chamber portion through the above hole D formed in the second pressurized water chamber portion, it is preferred to provide a buffer water chamber portion, which is to submerge the hole B to reduce the leakage of water through the above hole B, outside the second pressurized water chamber portion.

The method of the present invention can be applied to the drawing of a drawable material formed of a crystalline polymer which is desired to be drawn for obtaining a product as an end product, as described already. The drawing conditions can be determined as required depending upon the material of a drawn product as an end product (material of a drawable material), physical properties which a drawn product is required to have, productivity, and the like.

For example, the method of the present invention is used to obtain a PP fiber having a high fiber strength, preferably, a non-drawn yarn of a PP fiber, particularly a melt-spun yarn thereof is used, and the non-drawn yarn is drawn at a draw ratio of 6 or more in a pressurized saturated steam having an absolute pressure of 3.0 to 5.0 kg/cm$^2$. And, the absolute pressure of the pressurized saturated steam is more preferably 3.5 to 4.5 kg/cm$^2$, and the draw ratio is more preferably 7 or more. As already described, however, when the production rate is further increased, there can be used, as a drawing medium, a pressurized saturated steam having a higher temperature, e.g., 180° C. and a higher pressure (absolute pressure of 10.2 kg/cm$^2$).

The above non-drawn yarn for obtaining a PP fiber may be a yarn formed of a PP homopolymer or a yarn formed of a copolymer of PP and an a olefin (e.g., ethylene or butene-1). The non-drawn yarn of a PP hompolymer is preferably a yarn of an isotactic PP, and the isotactic PP is preferably a PP having a high crystallinity, particularly, having an isotactic PENTAD fraction (IPF) of at least 95%.

When a non-drawn yarn formed of an isotactic PP is drawn according to the method of the present invention to produce a PP fiber, it is visually observed that an inside of the fiber constitutes dark portions, when the PP fiber is observed under polarization through crossed Nicol prisms. These dark portions do not show uniform darkness, but it is shown that several linear portions which are by far darker than their vicinities are present in the fiber axis direction. It is assumed that the above dark portions are regions where the internal structure of the fiber alters (these regions will be referred to as "structurally altered regions" hereinafter).

When a synthetic fiber is observed under polarization through crossed Nicol prisms, the circumferential portion of the fiber is visually observed as a continuous light portion in many cases. In the present invention, therefore, the "inside of a fiber" (inside of a fiber observed under polarization through crossed Nicol prisms) means a region excluding "the circumferential portion of the fiber which is visually observed as a continuous light portion".

Figure 2:
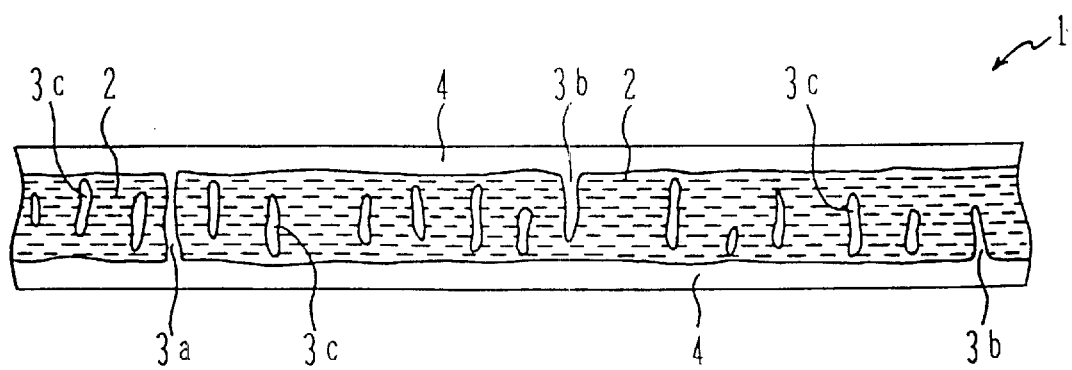
FIG. 2 schematically shows a PP fiber included in the drawn product of the present invention for explaining the form of "a linear light portion extending in a fiber diameter direction so as to cross a dark portion" described in the present specification with regard to the PP fiber.

In a PP fiber obtained by drawing the non-drawn yarn of an isotactic PP according to the method of the present invention, it is confirmed by visual observation that structurally altered regions (dark portions) are not always present along the entire length in the fiber axis direction, but linear light portions are intermittently present which extend in the fiber diameter direction so as to cross the above structurally altered region. It is not visually observed that all of the above linear light portions completely cross the above structurally altered region in the fiber diameter direction. For example, as shown in FIG. 2, in one PP fiber 1, light portions having various forms are visually observed, such as a portion 3$a$ which completely crosses a structurally altered region 2 in the fiber diameter direction, a portion 3$b$ which extends in the structurally altered region 2 in the fiber diameter direction from one side but discontinues somewhere toward the other side, a portion 3$c$ which extends partly in the structurally altered region 2 in the fiber diameter direction, and the like. In FIG. 2, reference numeral 4 shows the fiber circumferential portion which is observed as a continuous light portion.

In the present specification, therefore, "linear light portions are visually observed intermittently which extend in the fiber diameter direction so as to cross the dark portion (structurally altered region)" means that (a) a linear light portion extending in the fiber diameter direction so as to completely cross the dark portion (structurally altered region), (b) a linear light portion extending in the dark portion (structurally altered region) in the fiber diameter direction from one side but discontinuing somewhere toward the other side or (c) a linear light portion extending partly in the structurally altered region in the fiber diameter direction is visually observed.

The PP fiber having the above characteristics having a high fiber strength and a high Young's modulus can be easily produced at an industrial production speed, i.e., at a production rate of at least 50 m/minute according to the method of the present invention. For example, when dark portions visually observed inside the above PP fiber under polarization through crossed Nicol prisms have a total length of S, when the fiber has a length of L, and when the percentage of the dark portions visually observed inside the above PP fiber under polarization through crossed Nicol prisms based on the above fiber length L, i.e. (S/L)×100 (%) (this percentage will be referred to as "length percentage fc of structurally altered regions" hereinafter) is at least 60%, the PP fiber has a fiber strength of approximately 11 g/d or more and a Young's modulus of approximately 600 kg/mm$^2$ or more.

The above length percentage fc of structurally altered region in the present specification refers to a percentage determined as follows.

First, the above PP fiber is observed through a microscope under polarization through crossed Nicol prisms, forty measurement portions as a total are selected in the PP fiber, and enlarged microscopic photographs of the measurement portions are taken. Each measurement portion is arranged to have a fiber length of at least 0.25 mm.

Figure 3A:
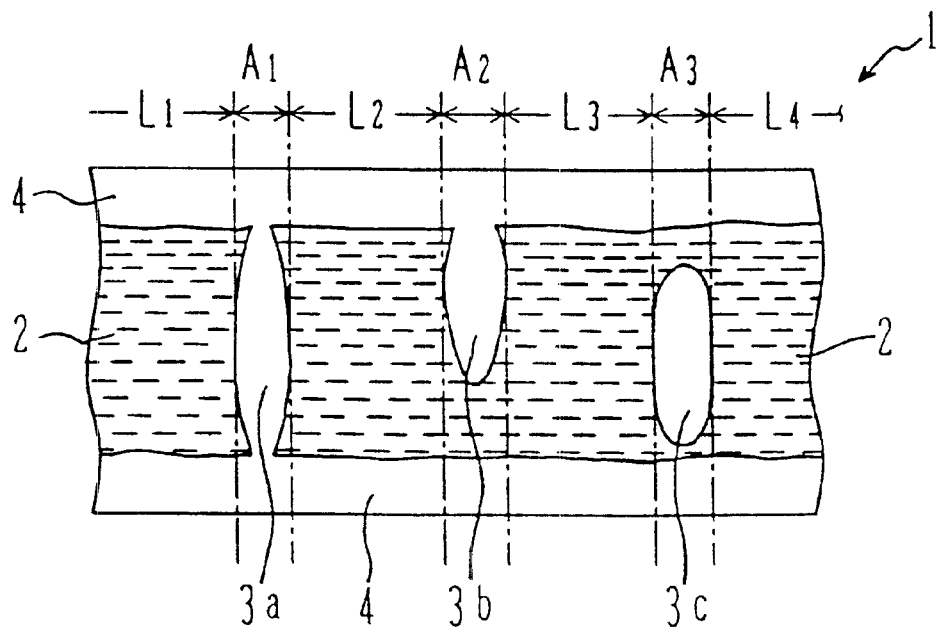
FIG. 3(a) and FIG. 3(b) schematically show a PP fiber included in the drawn product of the present invention for explaining a method of measuring "length percentage fc of structurally altered region" described in the present specification with regard to the PP fiber.
Figure 3B:
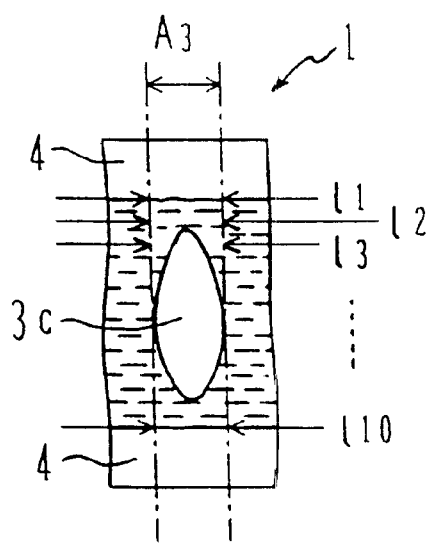

Then, in each of photographs of the measurement portions, as shown in FIG. 3($a$), regions $A_1, A_2, A_3, \ldots A_n$ corresponding to maximum widths of linear light portions 3*a*, 3*b* and 3*c* in the fiber axis direction are determined along the fiber diameter direction of dark portions 2 with regard to all of the linear light portions 3*a*, 3*b* and 3*c* extending in the fiber diameter direction so as to cross a structurally altered region 2. Then, dark portions 2 adjacent to these regions $A_1$, $A_2$, $A_3$, ... $A_n$ are measured for lengths $L_1$, $L_2$, $L_3$, $L_4$ ... $L_n$.

Further, as shown in FIG. 3(*b*), 10 measurement points are determined at equal intervals along the fiber diameter direction in each of the above regions $A_1$, $A_2$, $A_3$, ... $A_n$, dark portion 2 in the measurement points is measured for lengths $l_1$, $l_2$, $l_3$, ... $l_n$ in the fiber axis direction, and an average of these is calculated. These averages are used as lengths $L_{A1}$, $L_{A2}$, $L_{A3}$, ... $L_{An}$ of the dark portions in the regions $A_1$, $A_2$, $A_3$, ... $A_n$.

Thereafter, a total of the above lengths $L_1$, $L_2$, $L_3$, $L_4$, ... $L_n$ and the above lengths $L_{A1}$, $L_{A2}$, $L_{A3}$, ... $L_{An}$ is calculated with regard to each measurement portion, and this total value is taken as a total length of the dark portion 2 in each measurement portion (40 measurement portions in total). A percentage of the total length of the dark portion 2 based on the measurement total length (fiber length of measurement portion) is calculated with regard to each measurement portion, an average of these 40 portions is calculated, and the average is used as a percentage of the total length S of dark portion (structurally altered region) based on the fiber length L, i.e., the "length percentage fc of structurally altered region".

In FIGS. 3(*a*) and 3(*b*), those portions which are the same as those in FIG. 2 are shown by the same reference numerals.

When a non-drawn yarn (melt-spun yarn) formed of an isotactic PP, particularly, a non-drawn yarn formed of an isotactic PP having an IPF of 95 to 100%, preferably 97 to 100% is used as a drawable material, there can be easily obtained a PP fiber which exhibits high physical property values even under high-temperature environments. Further, when a non-drawn yarn formed of an isotactic PP having a Q value of less than 4 is used as a drawable material, it can be easily drawn at a high draw ratio, and the molecular orientation is promoted due to the drawing at a high draw ratio, so that there can be easily obtained a PP fiber having a higher Young's modulus.

For example, a non-drawn yarn formed of an isotactic PP having an IPF of 95 to 100%, preferably 97 to 100% and a Q value of less than 4 is used as a drawable material and when the absolute pressure of a pressurized saturated steam as a drawing medium is adjusted to 2.0 to 5.0 kg/cm$^2$, there can be industrially easily obtained a PP fiber having a Young's modulus of approximately 800 kg/mm$^2$ or more at ambient temperature and a heat shrinkage factor of approximately less than 5% at 120° C., or a PP fiber having a Young's modulus of approximately 500 kg/mm2 or more at 120° C., at a draw ratio of 7.5 or more, desirably 10 or more. The above PP fiber has a high fiber strength, as high as approximately 11.5 g/d or more, and its length percentage of the structurally altered region thereof is approximately 65% or more. The PP fiber obtained in the above case shows specific behaviors with regard to its heat shrinkage factor, or the heat shrinkage factor of the PP fiber at 120° C. increases with an increase in the draw ratio up to a draw ratio of approximately 6 but thereafter decreases with an increase in the draw ratio.

Further, when the absolute pressure of the pressurized saturated steam as a drawing medium is adjusted to approximately 3.8 kg/cm$^2$ (temperature of approximately 140° C.) or more, and when a non-drawn yarn formed of an isotactic PP is drawn at a high draw ratio, there can be easily obtained a PP fiber having high chemical resistance against one of aromatic organic solvents such as xylene, toluene and monochlorobenzene. That is, there can be easily obtained a PP fiber having chemical resistance sufficient for maintaining its fiber form without being dissolved when it is immersed in the above aromatic organic solvent having a temperature of 100° C. for an immersion time of 15 minutes.

The above "maintaining fiber form without being dissolved" in the present invention means the following state (1) or (2).

(1) A state where a fiber is substantially not dissolved in an organic solvent and it substantially does not undergo a change in form caused by shrinkage.

(2) A state where a fiber is partially dissolved but it substantially does not undergo a change in form caused by breaking or shrinkage.

(3) A state where a fiber shrinks to change its form, but it still has a fiber form.

For obtaining a PP fiber having the above chemical resistance, it is preferred to use, as a drawable material, a melt-spun yarn (non-drawn yarn) obtained from an isotactic PP fiber having an IPF of approximately 95 or more, preferably 95 to 97, a Q value of approximately 3.6 to 6.0, preferably 4.6 to less than 4.0 and a melt index (MI) of approximately 3 to 30, preferably 15 to 25, and it is preferred to adjust the absolute pressure of the above pressurized saturated steam to approximately 4.2 kg/cm$^2$ (temperature of 145° C.) or more. The draw ratio cannot be uniformly defined, since the chemical resistance of a PP fiber to be obtained is affected by a material used and drawing conditions and is further affected by the denier and spinning conditions of the non-drawn yarn.

Since, however, the above chemical resistance tends to be improved with an increase in the crystallinity of an obtained PP fiber, it is preferred to adjust the draw ratio to a highest possible ratio (e.g., a ratio of at least 9) so as to increase the above crystallinity. When a raw material, spinning conditions, a denier of a non-drawn yarn and drawing conditions are selected such that the above crystallinity is approximately 70% or more, there can be easily obtained a PP fiber having chemical resistance sufficient for maintaining its fiber form without being dissolved in any one of aromatic organic solvents such as xylene, toluene and monochlorobenzene when it is immersed in the above aromatic organic solvent under conditions where the aromatic organic solvent has a temperature of 100° C. and the immersion time period is 15 minutes.

When a PP fiber is obtained by drawing a non-drawn yarn formed of the above copolymer according to the method of the present invention, there are some cases where the above-described structurally altered region (dark portion) is not observed even if the above PP fiber is observed under polarization through crossed Nicol prisms. However, a PP fiber having a high fiber strength and a high Young's modulus can be easily obtained at an industrial production speed, i.e., at a production rate of at least 50 m/minute, regardless of whether or not the above structurally altered region (dark portion) is observed in the obtained PP fiber, by drawing a non-drawn yarn formed of the above copolymer according to the method of the present invention.

When the method of the present invention is used to obtain a PP fiber, there can be industrially easily obtained a PP fiber having a high fiber strength and a high Young's modulus, e.g., a PP fiber having a fiber strength of at least 11 g/d and a Young's modulus of at least 600 kg/mm$^2$, as described above, and further, the heat shrinkage factor of the above PP fiber is relatively low, as low as 0.5 to 8% at 120° C. Further, when the method of the present invention is used to obtain a PP fiber formed of a specific isotactic PP, there can be industrially easily obtained a PP fiber having a high fiber strength and a high Young's modulus and having a low heat shrinkage factor of approximately less than 5% at 120° C. as described above, a PP fiber having a Young's modulus of approximately 500 kg/mm² or more at a high temperature of 120° C., or a PP fiber which is further improved in chemical resistance.

Therefore, the above PP fiber can be used in a variety of fields of material fibers for a rope, a safety net and a belt string, reinforcing materials for various cables, cement and a rubber, material fibers for a woven fabric or a non-woven fabric and fibers for a filter, by selecting the denier (weight denier) thereof in the range of from 1 to 30 d depending upon an intended use.

The drawn product of the present invention will be explained hereinafter.

As already described, the drawn product of the present invention is a product obtained by drawing a drawable material according to the method of the present invention.

As described in the explanation of the drawing method of the present invention, the drawing method makes it possible to easily obtain a drawn product as an end product at an industrial production speed. In this drawing method, a drawable material can be deformed to a greater extent than in a conventional drawing method, and there can be therefore obtained a drawn product having more desirable physical properties than any conventional product. Further, when a drawable material is deformed in the same deformation amount as that in a conventional method, there can be obtained a drawn product having more desirable physical properties.

Therefore, the drawn product of the present invention has more desirable physical properties and can be industrially easily obtained. Explanations of specific examples of the drawn product and the drawable material which is a material for the drawn product are omitted, since they are already described in the explanation of the drawing method of the present invention.

The PP fiber processed article of the present invention will be explained hereinafter.

As described already, the PP fiber processed article of the present invention is formed of a PP fiber included in the drawn product of the present invention as a fiber material, and it has a fiber form of any one of a filament, a short cut chop and a staple fiber.

The above "filament" in the present specification refers to a long fiber (long filament) which can mechanically taken up, and the "filament" may be any one of a mono-filament and a multi-filament formed of a plurality of mono-filaments. The presence or absence of a crimp is not critical. Further, the above "short cut chop" in the present specification refers to a fiber having a length of less than 20 mm, and the presence or absence of a crimp is not critical. The "staple fiber" in the present specification refers to a crimped fiber having a length of at least 20 mm.

The PP fiber processed article having any one of the above fiber forms, provided by the present invention, can be obtained by processing a PP fiber included in the above drawn product of the present invention as a material fiber into a desired fiber form according to a conventional method.

When the fiber form of the PP fiber processed article of the present invention is a filament, the PP fiber processed article can be used as a material fiber for a woven fabric type filter (filter material), a cartridge type filter (filter material) formed by directly winding the fiber around a cylindrical material, a woven net (for construction), a woven sheet (sheet base material for construction), a rope and a belt. When the fiber form of the PP fiber processed article is a short cut chop, the PP fiber processed article can be used as a reinforcing fiber for automobile tires and a fiber for paper-making non-woven fabric. When the fiber form of the PP fiber processed article is a staple fiber, the PP fiber processed article can be used as a material fiber for a non-woven fabric for use as an automobile floor carpet, a separator for a secondary battery and a filter (filter material).

Particularly, a PP fiber processed article formed of a PP fiber having a heat shrinkage factor of less than approximately 5% at 120° C. or a PP fiber having a Young's modulus of at least 500 kg/mm² at 120° C. is suitable as a material fiber for the above various filters (filter materials), a reinforcing fiber for automobile tires, a material fiber for an automobile floor carpet and a material for a separator of a secondary battery.

The present invention will be explained more in detail with reference to Examples hereinafter.

EXAMPLE 1

(1) Preparation of Drawable Material (Melt-spun Fiber)

An isotactic PP (SA1HA, supplied by Nippon Polychem) having an isotactic PENTAD fraction (IPF) of 97%, a Q value of 3.6 and a melt index (MI) of 22 was used as a raw material, and it was melt-spun with a melt-spinning apparatus having a spinneret (spinning nozzle) having 120 orifices having a diameter of 0.5 mm each at a spinning temperature of 260° C. at a spinning rate of 600m/minute, to give melt-spun yarns (non-drawn yarn) having a single yarn denier of 25 d.

(2) Preparation of PP Fiber (Drawn Yarn)

First, silicone rubber packings having a hole in the central portion each were disposed in both ends and an interior (in four places as a total) of a cylinder to form a drawing chamber portion (total length 12.5 m), a first pressurized water chamber portion and a second pressurized water chamber portion. A roller as a non-drawn yarn feeding means was arranged outside the first pressurized water chamber, and a roller as a fiber withdrawing means was arranged outside the second pressurized water chamber, whereby a drawing apparatus was provided.

For drawing the non-drawn yarns with the above drawing apparatus, the drawing chamber portion was charged with a pressurized saturated steam having an absolute pressure of 4.2 kg/cm² (temperature 145° C.), and pressurized water having a pressure slightly higher than the internal pressure of the drawing chamber portion was reserved in the first pressurized water chamber portion and the second pressurized water chamber portion. Then, the non-drawn yarns obtained in the above (1) were drawn with the above drawing apparatus at a non-drawn yarn draw ratio of 11.5 at a drawn yarn withdrawing rate of 50 m/minute in a fiber withdrawing means, to give a PP fiber as an end product.

The thus-obtained PP fiber was observed through a microscope under polarization through crossed Nicol prisms, and its enlarged microscopic photograph (400 diameters) was taken. FIG. 1 shows a copy of the photograph.

As shown in FIG. 1, the peripheral portion of the above PP fiber was visually observed as a light portion, and an inside of the fiber was visually observed as a dark portion. And, there were intermittently observed linear light portions extending in the fiber diameter direction so as to cross the above dark portion (structurally altered region).

EXAMPLE 2

Non-drawn yarns were prepared in the same manner as in Example 1(1), and the non-drawn yarns were drawn under the same conditions as those in Example 1(2) except that the absolute pressure of the pressurized saturated steam was changed to 3.0 kg/cm$^2$ (temperature 133° C.) and that the draw ratio was changed to 8, to give a PP fiber as an end product.

The above PP fiber was observed through a microscope under polarization through crossed Nicol prisms, to show that it had a form similar to the form of the PP fiber obtained in Example 1.

EXAMPLE 3

Non-drawn yarns were prepared in the same manner as in Example 1(1), and the non-drawn yarns were drawn under the same conditions as those in Example 1(2) except that the absolute pressure of the pressurized saturated steam was changed to 5.0 kg/cm$^2$ (temperature 151° C.) and that the draw ratio was changed to 11.5, to give a PP fiber as an end product.

The above PP fiber was observed through a microscope under polarization through crossed Nicol prisms, to show that it had a form similar to the form of the PP fiber obtained in Example 1.

EXAMPLE 4

Non-drawn yarns were prepared in the same manner as in Example 1(1), and the non-drawn yarns were drawn under the same conditions as those in Example 1(2) except that the draw ratio was changed to 6, to give a PP fiber as an end product.

The above PP fiber was observed through a microscope under polarization through crossed Nicol prisms, to show that it had a form similar to the form of the PP fiber obtained in Example 1.

EXAMPLE 5

(1) Preparation of Drawable Material (Melt-spun Yarn)

An isotactic PP (EA9, supplied by Nippon Polychem) heaving an isotactic PENTAD fraction (IPF) of 95%, a Q value of 6.7 and a melt index (MI) of 0.65 was used as a raw material, and further, 500 ppm of a peroxide (2,5-dimethyl-2,5-di(t-butyloxy)hexane) was incorporated as a molecular weight adjuster. Then, the above raw material was melt-spun with a melt-spinning apparatus having a spinneret having 500 orifices having a diameter of 0.4 mm each at a spinning temperature of 300° C. at a spinning rate of 200 m/minute, to give melt-spun yarns (non-drawn yarns) having a single yarn denier of 10 d.

(2) Preparation of PP Fiber (Drawn Yarn)

The non-drawn yarns obtained in the above (1) were drawn under the same conditions as those in Example 1 except that the draw ratio was changed to 7, to give a PP fiber as an end product.

The above PP fiber was observed through a microscope under polarization through crossed Nicol prisms, to show that it had a form similar to the form of the PP fiber obtained in Example 1.

COMPARATIVE EXAMPLE 1

Non-drawn yarns were prepared under the same conditions as those in Example 1(1) and drawn at a drawing speed of 8 m/minute at a draw ratio of 11.5 in a silicone oil bath having a chamber length of 2 mm and having a temperature of 145° C., to give a PP fiber.

The above PP fiber was observed through a microscope under polarization through crossed Nicol prisms, to show that no dark portion (no structurally altered region) was visually observed.

COMPARATIVE EXAMPLE 2

Non-drawn yarns were prepared under the same conditions as those in Example 1(1) and drawn at a drawing speed of 5 m/minute up to a possible draw ratio (6.3) by contact heat drawing with a metal roll and a plate-shaped heater at 150° C., to give a PP fiber. The "possible draw ratio" means a maximum draw ratio at which drawing does not cause yarn breaking (and will be used in this sense hereinafter).

The above PP fiber was observed through a microscope under polarization through crossed Nicol prisms, to show that no dark portion (no structurally altered region) was visually observed.

COMPARATIVE EXAMPLE 3

Non-drawn yarns were prepared under the same conditions as those in Example 1(1) and drawn under the same conditions as those in Example 1(2) except that the absolute pressure of the pressurized saturated steam was changed to 1.65 kg/cm$^2$ (temperature 115° C.) and that the draw ratio was changed to 6.8, to give a PP fiber.

The above PP fiber was observed through a microscope under polarization through crossed Nicol prisms, to show that no dark portion (no structurally altered region) was visually observed.

Measurement I of Physical Property Values, Etc.

Each of the PP fibers obtained in Examples 1 to 5 and Comparative Examples 1 to 3 was measured for a denier (weight denier), a fiber strength, a Young's modulus, an elongation degree and a heat shrinkage factor at 120° C. Further, their length percentages of structurally altered regions referred to in the present invention were determined. Table 1 shows the results.

The above denier, fiber strength, Young's modulus, elongation degree and heat shrinkage factor at 120° C. were measured according to JIS L 1013 as follows.

(1) Denier Measured according to a simple method.

(2) Fiber Strength, Young's Modulus and Elongation Degree

A mono-filament was tested for tensile breaking under conditions where the inter-holder distance was 20 mm and the tension rate was 20 mm/minute.

(3) Heat Shrinkage Factor at 120° C.

A multi-filament was measured for a dry heat shrinkage factor (B method) in an oven at 120° C.

TABLE 1

|  | Denier (d) | Fiber strength (g/d) | Young's modulus (kg/mm$^2$) | Elongation degree (%) | Heat shrinkage factor (%) | fc (%) |
|---|---|---|---|---|---|---|
| Ex. 1 | 2.3 | 13.3 | 1,300 | 16 | 0.5 | 80 |
| Ex. 2 | 3.4 | 12.9 | 890 | 16 | 3.2 | 65 |

TABLE 1-continued

|  | Denier (d) | Fiber strength (g/d) | Young's modulus (kg/mm²) | Elongation degree (%) | Heat shrinkage factor (%) | fc (%) |
|---|---|---|---|---|---|---|
| Ex. 3 | 2.1 | 11.7 | 1,140 | 14 | 0.4 | 75 |
| Ex. 4 | 4.1 | 11.3 | 670 | 21 | 0.3 | 60 |
| Ex. 5 | 1.7 | 12.3 | 630 | 32 | 8.0 | 75 |
| CEx. 1 | 2.1 | 9.4 | 830 | 14 | 0.4 | – |
| CEx. 2 | 5.0 | 7.4 | 540 | 26 | 15 | – |
| CEx. 3 | 8.7 | 8.7 | 540 | 21 | 8.3 | – |

Ex. = Example, CEx. = Comparative Example

As shown in Table 1, in the PP fibers of Examples 1 to 5 obtained by drawing the melt-spun yarns according to the method of the present invention, the inside of each is visually observed as a dark portion, and there are intermittently observed light portions extending in the fiber diameter direction so as to cross the dark portion (structurally altered region), when they are observed under polarization through crossed Nicol prisms. These PP fibers have a high fiber strength, as high as 11.3 to 13.3 g/d although they were obtained at a take-up rate of 50 m/minute. Further, these PP fibers have a high Young's modulus of as high as 630 to 1,300 kg/mm², and they have a small heat shrinkage factor of as small as 0.3 to 8.0.

In contract to the above, in each of the PP fibers obtained in Comparative Examples 1 to 3, no dark portion (structurally altered region) is visually observed when they are observed under polarization through crossed Nicol prisms, and these PP fibers has a fiber strength of 7.4 to 9.4 g/d, which values are extremely lower than those of the PP fibers obtained in Examples 1 to 5.

EXAMPLE 6

Non-drawn yarns were prepared under the same conditions as those in Example 1(1) except that the spinning rate was changed to 300 m/minute, and the non-drawn yarns were drawn under the same conditions as those in Example 1(2) except that the draw ratio was changed to 11 and that the drawing speed (which means a withdrawing rate of fiber withdrawing means and is used in this sense hereinafter) was changed to 100 m/minute, to give a PP fiber as an end product.

The above PP fiber was observed through a microscope under polarization through crossed Nicol prisms, to show that it had a form similar to the form of the PP fiber obtained in Example 1.

EXAMPLE 7

Non-drawn yarns were prepared under the same conditions as those in Example 6, and were drawn under the same conditions as those in Example 6 except that the draw ratio was changed to 8, to give a PP fiber as an end product.

The above PP fiber was observed through a microscope under polarization through crossed Nicol prisms, to show that it had a form similar to the form of the PP fiber obtained in Example 6.

EXAMPLE 8

Non-drawn yarns were prepared under the same conditions as those in Example 6, and were drawn under the same conditions as those in Example 6 except that the absolute pressure of the pressurized saturated steam was changed to 2.0 kg/cm² (temperature 120° C.) and that the draw ratio was changed to 10, to give a PP fiber as an end product. In this case, the possible draw ratio was 10.5.

The above PP fiber was observed through a microscope under polarization through crossed Nicol prisms, to show that it had a form similar to the form of the PP fiber obtained in Example 6.

EXAMPLE 9

Non-drawn yarns were prepared under the same conditions as those in Example 6, and were drawn under the same conditions as those in Example 6 except that the absolute pressure of the pressurized saturated steam was changed to 4.9 kg/cm² (temperature 150° C.) and that the draw ratio was changed to 11.5, to give a PP fiber as an end product. In this case, the possible draw ratio was 11.5.

The above PP fiber was observed through a microscope under polarization through crossed Nicol prisms, to show that it had a form similar to the form of the PP fiber obtained in Example 6.

EXAMPLE 10

Non-drawn yarns were prepared and drawn under the same conditions as those in Example 6. Further, the drawn fiber was consecutively treated with an oil and dried, and the dry fiber was cut to a length of 5 mm with a rotary cutter to give a short cut chop. In this case, the operation caused no problem. The above short cut chop is included in the PP fiber processed article of the present invention.

EXAMPLE 11

(1) Preparation of Drawable Material (Melt-spun Fiber)

An isotactic PP (SA2D, supplied by Nippon Polychem) having an IPF of 97%, a Q value of 3.2 and an MI of 14 was used as a raw material, and it was melt-spun with a melt-spinning apparatus having a spinneret having 120 orifices having a diameter of 0.5 mm each at a spinning temperature of 250° C. at a spinning rate of 200 m/minute, to give melt-spun yarns (non-drawn yarn) having a single yarn denier of 90 d.

(2) Preparation of PP Fiber (Drawn Yarn)

36 Non-drawn yarns obtained above were combined to prepare a fiber bundle, and the fiber bundle was drawn with the same drawing apparatus as that used in Example 1(2) up to a total denier of 30,240 d. In this case, the absolute pressure of pressurized saturated steam was adjusted to 4.2 kg/cm² (temperature 145° C.), the draw ratio was set at 13, and the drawing rate was set at 60 m/minute.

(3) Preparation of PP Fiber Processed Article

The drawn yarns obtained in the above (1) were further carried while they were in a fiber bundle state, and during the carrying, the yarns were treated with a finish oil for preventing the occurrence of static electricity and heated to 80° C. by heating with steam, and the yarns were crimped with a stuffing box-type crimper having a width of 10 mm. The crimped fiber bundle was cut to a predetermined length with a rotary cutter, and the resultant short fiber was dried at 100° C. to give a staple fiber having a fiber length of 64 mm. The stable fiber is included in the PP fiber processed article of the present invention.

REFERENTIAL EXAMPLE 1

Non-drawn yarns were prepared under the same conditions as those in Example 6 and were drawn under the same conditions as those in Example 6 except that the draw ratio was changed to 5.5, to give a PP fiber as an end product.

The above PP fiber was observed through a microscope under polarization through crossed Nicol prisms, to show that almost no dark portion (structurally altered region) was observed.

COMPARATIVE EXAMPLE 4

Non-drawn yarns were prepared under the same conditions as those in Example 6 and were drawn under the same conditions as those in Example 6 except that the absolute pressure of the pressurized saturated steam was changed to 1.6 kg/cm$^2$ (temperature 115° C.) and that the draw ratio was changed to 9.5, to give a PP fiber as an end product. In this case, the possible draw ratio was 10.

The above PP fiber was observed through a microscope under polarization through crossed Nicol prisms, to show that almost no dark portion (structurally altered region) was observed.

Measurement II of Physical Property Values, Etc.

The PP fibers or the PP fiber processed articles obtained in Examples 6 to 11, Referential Example 1 and Comparative Example 4 were measured for a denier (weight denier), a fiber strength, an elongation degree, a Young's modulus at ambient temperature, a Young's modulus at 120° C. and a heat shrinkage factor at 120° C. in the same manner as in the previously described "Measurement I of physical property values, etc.".

Table 2 shows the results together with physical property values of PP used as fiber materials, temperatures of the pressurized saturated steams used as drawing media and draw ratios.

TABLE 2

| | Physical properties of PP as raw materials | | | Temperature of pressurized saturated steam (° C.) *1 | Draw ratio |
|---|---|---|---|---|---|
| | IPF (%) | Q value | MI (g/10 minutes) | | |
| Ex. 6 | 97 | 3.6 | 22 | 145 | 11.0 |
| Ex. 7 | 97 | 3.6 | 22 | 145 | 8.0 |
| Ex. 8 | 97 | 3.6 | 22 | 133 | 8.0 |
| Ex. 9 | 97 | 3.6 | 22 | 150 | 11.5 |
| Ex. 10 | 97 | 3.6 | 22 | 145 | 11.0 |
| Ex. 11 | 97 | 3.2 | 14 | 145 | 13.0 |
| REx. 1 | 97 | 3.6 | 22 | 145 | 5.5 |
| CEx. 4 | 97 | 3.6 | 22 | 115 | 9.5 |

| | Physical properties of fibers | | | | | |
|---|---|---|---|---|---|---|
| | Denier (d) | Fiber strength (g/d) | Elongation degree (%) | Young's modulus I *2 (kg/mm$^2$) | Young's modulus II *3 (kg/mm$^2$) | Heat shrinkage factor |
| Ex. 6 | 2.4 | 13.2 | 17 | 1,250 | 650 | 1.0 |
| Ex. 7 | 3.2 | 12.3 | 19 | 990 | 570 | 0.5 |
| Ex. 8 | 3.2 | 12.2 | 18 | 880 | 510 | 3.4 |
| Ex. 9 | 2.2 | 11.6 | 15 | 1,300 | 680 | 0.8 |
| Ex. 10 | 2.4 | 13.2 | 17 | 1,250 | 650 | 1.0 |
| Ex. 11 | 6.9 | 12.0 | 17 | 1,010 | 610 | 1.2 |
| REx. 1 | 4.7 | 6.5 | 70 | 320 | 76 | 6.3 |
| CEx. 4 | 2.9 | 9.7 | 24 | 640 | 320 | 6.1 |

Ex. = Example, REx. = Referential Example, CEx. = Comparative Example,
*1 Showing temperature of pressurized saturated steams used as drawing media.
*2 Showing Young's modulus at ambient temperature.
*3 Showing Young's modulus at 120° C.
*3 Showing heat shrinkage factor at 120° C.

As shown in Table 2, the PP fibers obtained in Examples 6 to 9 and the PP fiber processed articles obtained in Examples 10 and 11 have a high Young's modulus of as high as 850 to 1,300 kg/mm$^2$ at ambient temperature and have a low heat shrinkage factor of as low as 0.5 to 3.4% at 120° C. although they are obtained at a drawing rate greater than 50 m/minute. Further, these PP fibers and PP fiber processed articles have a high Young's modulus of as high as 510 to 680 kg/mm$^2$ at a high temperature of 120° C. and the fiber strength thereof is as high as 11.6 to 13.2 g/d.

The PP fiber obtained in Referential Example 1 is among those obtained according to the drawing method of the present invention. As is clear from its comparison with the PP fiber obtained in Comparative Example 2, there is found no substantial improvement in physical properties. This is presumably caused by a low draw ratio of 5.5 (6.3 in Comparative Example 2). As can be expected on the analogy of Example 4, the PP fiber can be remarkably improved in physical properties by increase the draw ratio. It is therefore required to increase the draw ratio to make it larger than a certain value as required depending upon the material of a drawable material, for obtaining a drawn product having improved physical properties according to the method of the present invention.

The PP fiber obtained in Comparative Example 4 has a relatively high fiber strength, while the value thereof is still low as compared with the PP fibers obtained in Examples 1 to 11. It is presumably because the drawing temperature is as low as 115° C. that the fiber strength is improved only to a small degree in spite of drawing at a relatively high draw ratio of 9.5.

EXAMPLE 12

Non-drawn yarns were prepared under the same conditions as those in Example 1(1), and the non-drawn yarns were drawn under the same conditions as those in Example 1(2) except that the absolute pressure of the pressurized saturated steam was changed to 5.7 kg/cm$^2$ (temperature 155° C.), that the draw ratio was changed to 8 and that the drawn yarn withdrawing rate (drawing speed) was changed to 420 m/minute, to give a PP fiber as an end product.

EXAMPLE 13

A PP fiber as an end product was obtained under the same conditions as those in Example 12 except that the draw ratio was changed to 9 and that the drawn yarn withdrawing rate (drawing speed) was changed to 200 m/minute.

Measurement III of Physical Property Values, Etc.

The PP fibers obtained in Examples 12 and 13 were measured for a denier (weight denier), a fiber strength, a Young's modulus at ambient temperature, an elongation degree and a heat shrinkage factor at 120° C. in the same manner as in the previously described "Measurement I of physical property values, etc.".

Table 3 shows the results.

TABLE 3

| | Example 12 | Example 13 |
|---|---|---|
| Spinning temperature (° C.) | 260 | 260 |
| Spinning rate (m/minute) | 600 | 600 |
| Denier of non-drawn yarn (d) | 25 | 25 |
| Drawing temperature (° C.)* | 155 | 155 |
| Draw ratio (times) | 8 | 9 |
| Drawing rate (m/minute) | 420 | 200 |
| Physical properties of fibers | | |
| Denier (d) | 3.0 | 2.7 |
| Fiber strength (g/d) | 11.0 | 12.1 |

TABLE 3-continued

|  | Example 12 | Example 13 |
|---|---|---|
| Elongation degree (%) | 20 | 19 |
| Young's modulus (kg/mm$^2$) | 650 | 830 |
| Heat shrinkage factor (%) | 1.0 | 0.8 |

*Showing temperatures of pressurized saturated steam used as drawing media.

As shown in Table 3, since pressurized saturated steam having a high temperature of 155° C. was used in Examples 12 and 13, the PP fibers obtained in these Examples had a high fiber strength of 11.0 g/d or 12.1 g/d and had a high Young's modulus of 650 kg/mm$^2$ or 830 kg/mm$^2$ although they were obtained at a very high drawing rate of 420 m/minute or 200 m/minute. Further, the heat shrinkage factors of these PP fibers at 120° C. were as small as 1.0% or 0.8%.

EXAMPLES 14–17

The same isotactic PP as the isotactic PP used in Example 1 was used as a fiber material, and the isotactic PP was melt-spun under spinning conditions shown in Table 4 to obtain non-drawn yarns having a denier of 52 d. Then, the non-drawn yarns were drawn under the same conditions as those in Example 1(2) except that the draw ratio was changed as shown in Table 4, to give PP fibers as end products in these Examples.

EXAMPLES 18–20

The same isotactic PP as the isotactic PP used in Example 1 was used as a fiber material, and the isotactic PP was melt-spun under the same conditions as those in Example 1(1) as shown in Table 5 to obtain non-drawn yarns having a denier of 25 d. Then, the non-drawn yarns were drawn under the same conditions as those in Example 1(2) except that the draw ratio was changed as shown in Table 5, to give PP fibers as end products in these Examples. The PP fiber obtained in Example 20 was the same as the PP fiber obtained in Example 1.

COMPARATIVE EXAMPLE 5

Non-drawn yarns having a denier of 52 d were prepared by melt-spinning under the same conditions as those in Examples 14 to 17, and then, the non-drawn yarns were drawn 6 times with a hot roll at 120° C., to give a PP fiber.

COMPARATIVE EXAMPLE 6

Non-drawn yarns having a denier of 25 d were prepared by melt-spinning under the same conditions as those in Example 1, and then, the non-drawn yarns were drawn 4 times with a hot roll at 120° C., to give a PP fiber.

Measurement IV of Physical Property Values, Etc.

The PP fibers obtained in Examples 14 to 20 and Comparative Examples 5 and 6 were measured for a denier (weight denier), a fiber strength, an elongation degree, a Young's modulus at room temperature and a heat shrinkage factor at 120° C. in the same manner as in the previously described "Measurement I of physical property values, etc.".

Further, each PP fiber was measured for a heat shrinkage factor at 140° C. in the same manner as in the previously described "Measurement I of physical property values, etc." except that an oven at 140° C. was used.

Further, each PP fiber was measured for a crystallinity and a crystal size of a 110 face.

(a) Crystallinity

With an X-ray diffractometer (XD-3A model, supplied by Shimadzu Corporation, Xray tube: Cu anode), an X-ray diffraction curve was prepared under conditions of a scanning range of 26–10° (θ), a scanning rate of $1/40°$ min$^{-1}$, a time constant of 10 sec., a sample rotation rate of 57 rpm and a chart speed of 5 mm/minute, and on the basis of the X-ray diffraction curve, diffraction peaks were divided by a construction method. Then, a crystallinity was calculated according to a Natta method.

(b) Crystal Size of 110 Face

Determined by a Half Value Width Method.

Evaluation of Chemical Resistance

Samples having a length of 40 mm or more were taken from the PP fibers obtained in Examples 14 to 20 and Comparative Examples 5 and 6, and the samples were immersed in an aromatic organic solvent, such as xylene, toluene, monochlorobenzene, o-dichlorobenzene or 1,2,4-trichlorobenzene, at 100° C. for 15 minutes. Then, their forms were visually observed to evaluate the samples for chemical resistance.

Further, for referential purpose, the samples were also evaluated for chemical resistance against a 61% nitric acid aqueous solution, a 30% hydrogen peroxide aqueous solution, a sodium hypochlorite solution and a commercially available edible oil (mixture of rapeseed oil and soybean oil).

Table 4 or 5 also shows the above evaluation results.

TABLE 4

|  | Ex. 14 | Ex. 15 | Ex. 16 | Ex. 17 |
|---|---|---|---|---|
| Spinning temperature (° C.) | 260 | 260 | 260 | 260 |
| Spinning rate (m/minute) | 286 | 286 | 286 | 286 |
| Denier of non-drawn yarn (d) | 52 | 52 | 52 | 52 |
| Drawing method | Method I *4 | Method I *4 | Method I *4 | Method I *4 |
| Drawing temperature (° C.) | 145 *5 | 145 *5 | 145 *5 | 145 *5 |
| Draw ratio (times) | 12 | 13 | 14 | 15 |
| Physical properties of fibers |  |  |  |  |
| Denier (d) | 4.2 | 3.9 | 3.7 | 3.4 |
| Fiber strength (g/d) | 11.9 | 13.0 | 12.0 | 11.7 |
| Elongation degree (%) | 19 | 19 | 18 | 16 |
| Young's modulus (kg/mm$^2$) | 980 | 1,030 | 950 | 1,050 |
| Heat shrinkage factor at 120° C. (%) | 0.6 | 0.6 | 0.5 | 0.4 |
| Heat shrinkage factor at 140° C. (%) | 4.5 | 3.9 | 3.7 | 3.2 |
| Crystallinity (%) | 70 | 72 | 75 | 77 |
| Crystal size of 110 face (Å) | 89 | 91 | 93 | 92 |
| Chemical resistance *1 |  |  |  |  |
| Xylene *2 | ◯ | ◯ | ◯ | ◯ |
| Toluene *2 | Δ | ◯ | ◯ | ◯ |
| Monochlorobenzene *2 | ◯ | ◯ | ◯ | ◯ |
| o-Dichlorobenzene *2 | ◯ | ◯ | ◯ | ◯ |
| 1,2,4-trichlorobeznene *2 | ◯ | ◯ | ◯ | ◯ |
| 61% Nitric acid aqueous solution *2 | ◯ | ◯ | ◯ | ◯ |
| 30% Hydrogen peroxide aqueous solution *3 | ◯ | ◯ | ◯ | ◯ |

TABLE 4-continued

|  | Ex. 14 | Ex. 15 | Ex. 16 | Ex. 17 |
|---|---|---|---|---|
| Sodium hypochlorite solution *3 | ○ | ○ | ○ | ○ |
| Edible oil *2 | ○ | ○ | ○ | ○ |

Ex. = Example
*1 ○ ... Showing that a sample was substantially not dissolved in a solvent and that it substantially did not undergo any change in form caused by shrinking.
Δ ... Showing that a sample underwent a change in form but still retained a fiber form.
X ... Showing that a sample was completely dissolved in a solvent.
*2 Showing that when a fiber was evaluated for chemical resistance, a sample was immersed in a solvent having a temperature of 100° C. for 15 minutes.
*3 Showing that when a fiber was evaluated for chemical resistance, a sample was immersed in a solvent having a temperature of room temperature for 1 hour. The sodium hypochlorite solution used had an effective chlorine amount of at least 5%.
*4 Showing the method of the present invention using pressurized saturated steam as a drawing medium.
*5 Showing the temperature of the pressurized saturated steam used as a drawing medium.

TABLE 5

|  | Ex. 18 | Ex. 19 | Ex. 20 | CEx. 5 | CEx. 6 |
|---|---|---|---|---|---|
| Spinning temperature (° C.) | 260 | 260 | 260 | 260 | 260 |
| Spinning rate (m/minute) | 600 | 600 | 600 | 600 | 600 |
| Denier of non-drawn yarn (d) | 25 | 25 | 25 | 52 | 25 |
| Drawing method | Method I *4 | Method I *4 | Method I *4 | Hot roll method | Hot roll method |
| Drawing temperature (° C.) | 145 *5 | 145 *5 | 145 *5 | 120 | 120 |
| Draw ratio (times) | 9 | 10 | 11.5 | 6 | 4 |
| Physical properties of fibers |  |  |  |  |  |
| Denier (d) | 2.9 | 2.5 | 3.2 | 8.8 | 6.5 |
| Fiber strength (g/d) | 11.9 | 12.3 | 13.3 | 7.2 | 5.4 |
| Elongation degree (%) | 19 | 18 | 16 | 34 | 45 |
| Young's modulus (kg/mm$^2$) | 650 | 980 | 1,300 | 390 | 260 |
| Heat shrinkage factor at 120° C. (%) | 1.5 | 1.0 | 0.5 | 1.6 | 4.9 |
| Heat shrinkage factor at 140° C. (%) | 6.0 | 4.7 | 4.5 | 5.8 | 9.8 |
| Crystallinity (%) | 70 | 71 | 75 | 64 | 63 |
| Crystal size of 110 face (Å) | 91 | 92 | 97 | 88 | 79 |
| Chemical resistance *1 |  |  |  |  |  |
| Xylene *2 | ○ | ○ | ○ | X | X |
| Toluene *2 | ○ | ○ | ○ | X | X |
| Monochlorobenzene *2 | ○ | ○ | ○ | X | X |
| o-Dichlorobenzene *2 | ○ | ○ | ○ | ○ | ○ |
| 1,2,4-tri-chlorobeznene *2 | ○ | ○ | ○ | ○ | ○ |
| 61% Nitric acid aqueous solution *2 | ○ | ○ | ○ | ○ | ○ |
| 30% Hydrogen peroxide aqueous solution *3 | ○ | ○ | ○ | ○ | ○ |
| Sodium hypochlorite solution *3 | ○ | ○ | ○ | ○ | ○ |
| Edible oil *2 | ○ | ○ | ○ | ○ | ○ |

*1–*5: See footnotes to Table 4.

As shown in Table 4 or 5, the PP fibers obtained in Examples 14 to 20 have both high fiber strength and a high Young's modulus. Further, these PP fibers have high chemical resistance against the previously described aromatic organic solvents even under a high-temperature environment where the liquid temperature is 100° C.

On the other hand, the PP fibers obtained by drawing the non-drawn yarns by a hot roll method in Comparative Examples 5 and 6 have poor fiber strength and a small Young's modulus as compared with the any one of the PP fibers obtained in Examples 14 to 20. Further, the PP fibers obtained in these Comparative Examples are extremely poor in chemical resistance against xylene, toluene and monochlorobenzene as compared with any one of the PP fibers obtained in Examples 14 to 20.

As explained above, according to the drawing method of the present invention, a drawable material can be deformed to a greater extent than in any conventional method, so that a drawn product having excellent physical properties over conventional ones can be obtained. Further, when a drawable material is deformed in the same deformation amount as that in any conventional method, there can be obtained a drawn product having more desirable physical properties.

According to the present invention, therefore, there can be easily industrially produced drawn products that are improved in reliability and durability.

What is claimed is:

1. A drawing method which comprises:
    charging pressurized saturated steam having an absolute pressure of at least 2.0 kg/cm$^2$ as a drawing medium into an airtight container having a drawable material inlet for feeding a drawable material thereinto and a drawn product outlet for withdrawing a drawn product formed by drawing the drawable material, to provide a drawing chamber:
    utilizing pressurized water to prevent the leakage of the pressurized saturated steam through said drawable material inlet and said drawn product outlet, respectively;
    introducing a drawable material into the pressurized water which is preventing the leakage of the pressurized saturated steam from said drawable material inlet;
    introducing said drawable material through said drawable material inlet to the drawing chamber to draw the drawable material after water adheres to the drawable material surface; and then,
    introducing a drawn product withdrawn through said drawn product outlet into the pressurized water which is preventing the leakage of the pressurized saturated steam through said drawn product outlet, to cool the drawn product.

2. The method of claim 1, wherein the method uses a drawing apparatus having
    a drawing chamber portion formed of an airtight container charged with pressurized saturated steam as a drawing medium, said airtight container having a drawable material inlet for feeding a drawable material thereinto and a drawn product outlet for withdrawing a drawn product formed by drawing the above drawable material fed inside;
    a first pressurized water chamber portion tightly disposed on said drawable material inlet side of said drawing chamber portion;
    a second pressurized water chamber portion tightly disposed on the drawn product outlet side of said drawing chamber portion;
    holes formed in said first and second pressurized water chamber portions one each so as to lead the drawable material or the drawn product from an outside of said first pressurized water chamber portion to an outside of the above second pressurized water chamber through an inside of said first pressurized water chamber portion, said drawable material inlet, an inside of said drawing chamber portion, said drawn product outlet and an inside of said second pressurized water chamber portion;

drawable material feeding means for feeding the drawable material into said first pressurized water chamber; and drawn product withdrawing means for withdrawing the drawn product from said second pressurized water chamber portion at a rate higher than the rate at which the drawable material feeding means feeds the drawable material.

3. The method of claim 2, wherein the method uses the drawing apparatus in which buffer water chamber portions are provided outside the first pressurized water chamber and the second pressurized water chamber, respectively, said buffer water chamber portion being to submerge the hole formed in the first pressurized water chamber portion or the hole formed in the second pressurized water chamber portion to reduce the leakage of water in the first pressurized water chamber portion or the second pressurized water chamber portion, through said holes.

4. The method of claim 1, wherein a non-drawn material formed of a crystalline polymer is used as the drawable material and the non-drawn material is drawn to obtain the drawn product.

5. The method of claim 1, wherein a non-drawn yarn of a polypropylene fiber is used as the drawable material and the non-drawn yarn is drawn to obtain a polypropylene fiber.

6. The method of claim 5, wherein the drawing is carried out in a pressurized saturated steam having an absolute pressure of 3.0 to 5.0 kg/cm$^2$.

7. The method of claim 5, wherein the drawable material is drawn at a draw ratio of at least 6.

8. The method of claim 5, wherein a non-drawn yarn of a polypropylene fiber formed of an isotactic polypropylene is drawn to obtain a polypropylene fiber in which an inside of the fiber is visually observed as a dark portion, and liner light portions extending in the fiber diameter direction so as to cross said dark portion are visually observed intermittently, when the polypropylene fiber is observed under polarization through crossed Nicol prisms.

9. The method of claim 8, wherein a polypropylene fiber is obtained in which, when the dark portion visually observed inside the fiber under polarization through crossed Nicol prisms has a total length of S, and when the fiber has a length of L, the percentage of the total length of said dark portion visually observed as a dark portion based on said fiber length L, i.e. (S/L)×100 (%) is at least 60%.

10. The method of claim 5, wherein a polypropylene fiber having a fiber strength of at least 11 g/d and a Young's modulus of at least 600 kg/mm$^2$ is obtained.

11. The method of claim 8, wherein a polypropylene fiber having a Young's modulus of at least 800 kg/mm$^2$ at ambient temperature and a heat shrinkage factor of less than 5% at 120° C. is obtained.

12. The method of claim 8, wherein a polypropylene fiber having a Young's modulus of at least 500 kg/mm$^2$ at 120° C. is obtained.

* * * * *